United States Patent
Guo et al.

(10) Patent No.: US 12,014,529 B2
(45) Date of Patent: Jun. 18, 2024

(54) IMAGE PROCESSING METHOD AND APPARATUS USING NEURAL NETWORK

(71) Applicant: Samsung Electronics Co., Ltd., Suwon-si (KR)

(72) Inventors: Tianchu Guo, Beijing (CN); Hui Zhang, Beijing (CN); Xiabing Liu, Beijing (CN); ByungIn Yoo, Seoul (KR); ChangKyu Choi, Seongnam-si (KR); Jaejoon Han, Seoul (KR); YoungJun Kwak, Seoul (KR); Yongchao Liu, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 500 days.

(21) Appl. No.: 17/153,018

(22) Filed: Jan. 20, 2021

(65) Prior Publication Data

US 2021/0224511 A1    Jul. 22, 2021

(30) Foreign Application Priority Data

Jan. 21, 2020  (CN) .................... 202010071912.3
Dec. 2, 2020   (KR) .................... 10-2020-0166879

(51) Int. Cl.
| | |
|---|---|
| G06V 10/40 | (2022.01) |
| G06N 3/08 | (2023.01) |
| G06T 3/10 | (2024.01) |
| G06T 5/50 | (2006.01) |
| G06V 10/80 | (2022.01) |
| G06V 10/82 | (2022.01) |

(Continued)

(52) U.S. Cl.
CPC ............... *G06V 10/40* (2022.01); *G06N 3/08* (2013.01); *G06T 3/10* (2024.01); *G06T 5/50* (2013.01); *G06V 10/809* (2022.01); *G06V 10/82* (2022.01); *G06V 40/168* (2022.01); *G06V 40/193* (2022.01)

(58) Field of Classification Search
CPC ...... G06V 10/40; G06V 10/809; G06V 10/82; G06V 40/168; G06V 40/193; G06N 3/08; G06T 3/0056; G06T 5/50; G06F 18/254
See application file for complete search history.

(56) References Cited

U.S. PATENT DOCUMENTS

| | | |
|---|---|---|
| 6,178,257 B1 | 1/2001 | Alumot et al. |
| 8,103,087 B2 | 1/2012 | Maeda et al. |

(Continued)

FOREIGN PATENT DOCUMENTS

| | | |
|---|---|---|
| KR | 10-2010-0039411 A | 4/2010 |
| KR | 10-1843066 B1 | 5/2018 |

(Continued)

OTHER PUBLICATIONS

Ruta, Dymitr, et al., "An Overview of Classifier Fusion Methods," *Computing and Information systems*, 7, 1, 2000 (pp. 1-10).

(Continued)

*Primary Examiner* — Phuoc Tran
(74) *Attorney, Agent, or Firm* — NSIP Law

(57) ABSTRACT

An image processing method and apparatus using a neural network are provided. The image processing method includes generating a plurality of augmented features by augmenting an input feature, and generating a prediction result based on the plurality of augmented features.

24 Claims, 12 Drawing Sheets

(51) Int. Cl.
  *G06V 40/16* (2022.01)
  *G06V 40/18* (2022.01)

(56) References Cited

U.S. PATENT DOCUMENTS

| | | | |
|---|---|---|---|
| 8,793,283 B1 | 7/2014 | Austern et al. | |
| 10,751,548 B2* | 8/2020 | Han | G16H 30/40 |
| 11,468,265 B2* | 10/2022 | Chhabra | G06F 18/2148 |
| 2020/0327667 A1* | 10/2020 | Arbel | G06T 7/0014 |
| 2021/0216817 A1* | 7/2021 | Sommerlade | G06T 11/00 |
| 2021/0326571 A1* | 10/2021 | Nakvosas | G06N 3/04 |
| 2022/0245932 A1* | 8/2022 | Gauerhof | G06N 3/045 |

FOREIGN PATENT DOCUMENTS

| | | |
|---|---|---|
| KR | 10-1936029 B1 | 1/2019 |
| KR | 10-2019-0085159 A | 7/2019 |

OTHER PUBLICATIONS

Eragi, Saddam M., et al., "Human Identity Recognition based on Facial Images: Via Supervised Autoencoder Features Representation," *2017 Sudan Conference on Computer Science and Information Technology (SCCSIT)*. IEEE, 2017 (pp. 1-6).

Liu, Xiaofeng, et al., "Data Augmentation via Latent Space Interpolation for Image Classification," *2018 24th International Conference on Pattern Recognition (ICPR)*. IEEE, Beijing, Peoples Republic of China, Aug. 20-24, 2018 (pp. 728-733).

Sagi, Kazutoshi et al., "Rollable Latent Space for Azimuth Invariant SAR Target Recognition." *IGARSS 2018-2018 IEEE International Geoscience and Remote Sensing Symposium. IEEE*, 2018 (pp. 21-24).

Extended European Search Report dated Jun. 11, 2021 in counterpart European Patent Application No. 21152723.9 (9 pages in English).

Song, Dong, et al., "Training Genetic Programming on Half a Million Patterns: An Example from Anomaly Detection," *IEEE transactions on evolutionary computation*, 9, 3, 2005 (pp. 225-239).

Jia, Yangqing, et al., "Caffe: Convolutional Architecture for Fast Feature Embedding," *Proceedings of the 22nd ACM international conference on Multimedia*, Jun. 20, 2014 (pp. 1-4).

Wang, Huiwen et al., "An effective intrusion detection framework based on SVM with feature augmentation," *Knowledge-Based Systems*, 136, 2017 (pp. 130-139).

Chen, Zitian, et al., "Semantic Feature Augmentation in Few-shot Learning," arXiv preprint arXiv:1804.05298, 86, Apr. 25, 2018 (pp. 1-21).

* cited by examiner

IMAGE PROCESSING METHOD AND APPARATUS USING NEURAL NETWORK

CROSS-REFERENCE TO RELATED APPLICATIONS

This application claims the benefit under 35 USC 119(a) of Chinese Patent Application No. 202010071912.3, filed on Jan. 21, 2020, in the China National Intellectual Property Administration and Korean Patent Application No. 10-2020-0166879, filed on Dec. 2, 2020, in the Korean Intellectual Property Office, the entire disclosures of which are incorporated herein by reference for all purposes.

BACKGROUND

Field

The following description relates to an image processing method and apparatus using a neural network.

Description of Related Art

Automation of a recognition process has been implemented using, for example, a neural network model implemented by a processor as a special calculation structure, which may provide a computationally intuitive mapping between an input pattern and an output pattern after considerable training. An ability to be trained to generate such mapping may be referred to as a "training ability of a neural network." Moreover, due to specialized training, such a specialized and trained neural network may have a generalization ability to generate a relatively accurate output for an input pattern that is not trained.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image processing method including extracting an input feature from an input image, generating augmented features by augmenting the input feature, and generating a prediction result based on the augmented features.

The generating of the augmented features may include generating a first augmented feature based on executing a neural network model based on the input feature and a first transformation code.

The neural network model may include an encoding model and a decoding model, and the generating of the first augmented feature may include encoding the input feature to a latent feature using the encoding model, combining the latent feature and the first transformation code to determine a combined feature, and decoding the combined feature to the first augmented feature using the decoding model.

The image processing method of claim 2, wherein the generating of the augmented features may include generating a second augmented feature based on executing the neural network model based on the input feature and a second transformation code.

The first transformation code and the second transformation code may correspond to different transformations.

The generating of the prediction result may include generating the prediction result based on a fusion of a first partial prediction result according to the first augmented feature and a second partial prediction result according to the second augmented feature.

The generating of the prediction result may include generating a plurality of partial prediction results based on the plurality of augmented features, and generating the prediction result by fusing the plurality of partial prediction results.

The generating of the augmented features may include augmenting the input feature based on transformation parameters corresponding to different transformations.

The transformations may include any one or any combination of scaling, cropping, flipping, padding, rotation, translation, color transformation, brightness transformation, contrast transformation, and noise addition.

In another general aspect, there is provided an image processing apparatus including a processor configured to extract an input feature from an input image, generate augmented features by augmenting the input feature, and generate a prediction result based on the augmented features.

The processor may be configured to generate a first augmented feature based on executing a neural network model based on the input feature and a first transformation code.

The neural network model may include an encoding model and a decoding model, and the processor may be configured to encode the input feature to a latent feature using the encoding model, combine the latent feature and the first transformation code to determine a combined feature, and decode the combined feature to the first augmented feature using the decoding model.

The processor may be configured to generate a second augmented feature based on executing the neural network model based on the input feature and a second transformation code.

The processor may be configured to generate the prediction result based on a fusion of a first partial prediction result according to the first augmented feature and a second partial prediction result according to the second augmented feature.

The processor may be configured to augment the input feature based on transformation parameters corresponding to different transformations.

In another general aspect, there is provided an electronic apparatus comprising a camera configured to generate an input image, and a processor configured to extract an input feature from the input image, generate augmented features by augmenting the input feature, and generate a prediction result based on the augmented features.

The processor may be configured to generate a first augmented feature based on executing a neural network model based on the input feature and a first transformation code.

The processor may be configured to generate a second augmented feature based on executing a neural network model based on the input feature and a second transformation code.

The processor may be configured to generate the prediction result based on a fusion of a first partial prediction result according to the first augmented feature and a second partial prediction result according to the second augmented feature.

Other features and aspects will be apparent from the following detailed description, the drawings, and the claims.

Figure 1:
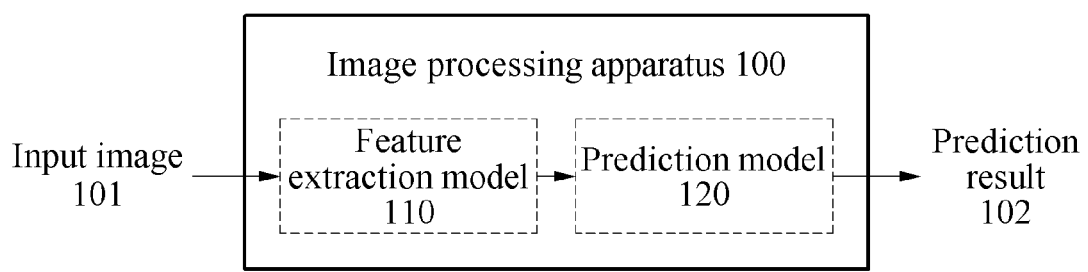
FIG. 1 illustrates an example of an operation of an image processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. As used herein, the term "and/or" includes any one and any combination of any two or more of the associated listed items. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Hereinafter, examples will be described in detail with reference to the accompanying drawings, and like reference numerals in the drawings refer to like elements throughout.

FIG. 1 illustrates an example of a configuration and an operation of an image processing apparatus 100. Referring to FIG. 1, the image processing apparatus 100 may include a feature extraction model 110 and a prediction model 120, and may generate a prediction result 102 for an input image 101 using the feature extraction model 110 and the prediction model 120. The feature extraction model 110 and the prediction model 120 may each correspond to a neural network model, and the image processing apparatus 100 may perform neural network model-based prediction. For example, prediction for the input image 101 may include detection, tracking, recognition, identification, classification, authentication, and verification of an object in the input image 101. In an example, the prediction result 102 may include eye position information according to eye detection and/or eye tracking, identity and/or category information according to object recognition, identification, and/or classification, and authentication information according to user authentication and/or verification.

A neural network model may correspond to a deep neural network (DNN) including a plurality of layers. The plurality of layers may include an input layer, a hidden layer, and an output layer. The neural network model may include a fully connected network (FCN), a convolutional neural network (CNN), and a recurrent neural network (RNN). For example, a portion of a plurality of layers in the neural network model may correspond to a CNN, and another portion of the layers may correspond to an FCN. In this example, the CNN may be referred to as a "convolution layer" and the FCN may be referred to as a "fully connected layer."

In the CNN, data input to each layer may be referred to as an "input feature map" and data output from each layer may be referred to as an "output feature map". The input feature map and the output feature map may also be referred to as activation data. When a convolutional layer corresponds to an input layer, an input feature map of the input layer may correspond to the input image 101.

The neural network model may be trained based on deep learning, and may perform inference suitable for the purpose of training, by mapping input data and output data that are in a nonlinear relationship. The deep learning may be a machine learning scheme for solving an issue such as image or voice recognition from a big data set. The deep learning may be understood as a process of solving an optimization issue to find a point at which energy is minimized while training the neural network model based on prepared training data.

Through supervised or unsupervised learning of the deep learning, a structure of the neural network model or a weight corresponding to a model may be obtained, and input data and output data of the neural network model may be mapped to each other through the weight. For example, when a width and a depth of the neural network model are sufficiently large, the neural network model may have a capacity large enough to implement an arbitrary function. When the neural network model is trained on a sufficiently large quantity of training data through an appropriate training process, optimal performance may be achieved.

In the following description, the neural network model may be expressed as being "pre-trained", where "pre-" may indicate a state before the neural network model is "started". The "started" neural network model may indicate that the neural network model is ready for inference. For example, "start" of the neural network model may include a loading of the neural network model in a memory, or an input of input data for inference to the neural network model after the neural network model is loaded in the memory.

The feature extraction model 110 may extract a feature from the input image 101, and the prediction model 120 may generate the prediction result 102 corresponding to the extracted feature. For example, the feature extraction model 110 and the prediction model 120 may correspond to a CNN and an FCN, respectively. In training and/or inference of the neural network model, diversity of input data and/or training data may have an influence on an accuracy of the prediction result 102. Data augmentation may be a technology of diversifying training data through transformations, for example, a geometric transformation or a color transformation. Through the data augmentation, overfitting may be inhibited.

The image processing apparatus 100 may perform prediction using a data augmentation technology to secure the diversity of training images in a training operation. For example, various augmented training images may be secured through data augmentation, a feature may be extracted from each of augmented training images, and prediction may be performed. As a result, the neural network model may be updated. For the above training scheme, a feature may need to be extracted from each of the augmented training images, which may require a considerably larger amount of computation than other operations of a prediction process.

Feature augmentation according to examples may be applied to the neural network model of the image processing apparatus 100. The feature augmentation may be a kind of data augmentation, but may be used to augment a feature instead of an image, unlike the conventional data augmentation. For example, when the feature extraction model 110 extracts an input feature from the input image 101, augmented features of the input feature may be generated through the feature augmentation. The prediction model 120 may generate the prediction result 102 based to the augmented features.

Unlike the conventional data augmentation, in the feature augmentation, an operation of extracting a feature from an image is not repeated. In an example of data augmentation, to obtain "N" augmented features, a CNN may need to be executed "N" times. In the feature augmentation, the CNN may be executed once, and a feature extracted by executing the CNN once may be augmented "N" times, to obtain "N" augmented features. Thus, through the feature augmentation, an amount of computation may be significantly reduced.

Due to a relatively small amount of computation, the feature augmentation may be used for inference in addition to training. The existing data augmentation is used mainly for training due to a relatively large amount of computation, however, the feature augmentation may require a relatively small amount of computation to be used even in an inference operation. Thus, in both the training and the inference, an accuracy of prediction may be enhanced by augmentation technologies.

Figure 2:
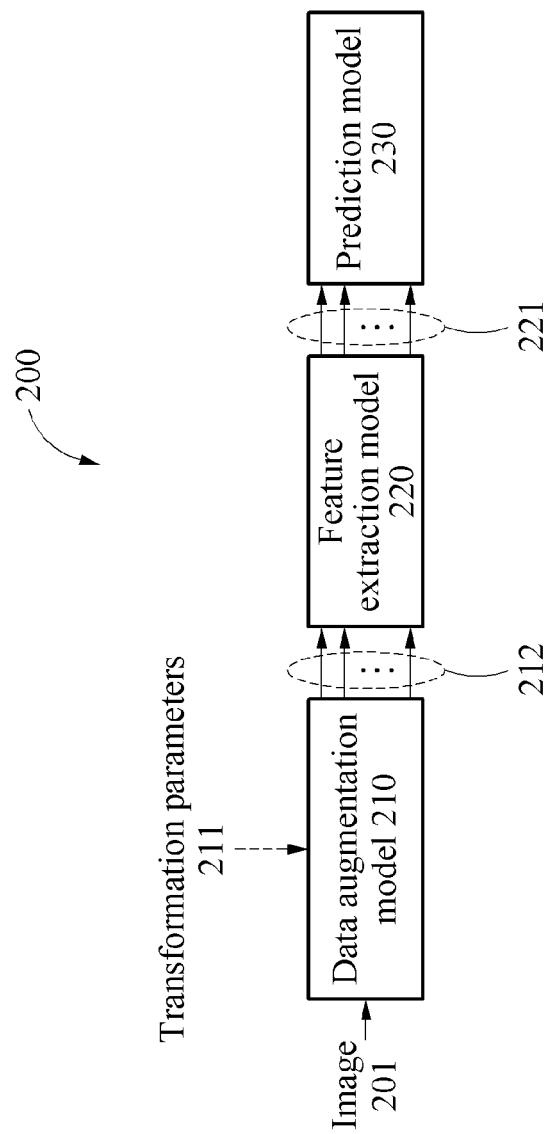
FIG. 2 illustrates a conventional data augmentation method.
Figure 3:
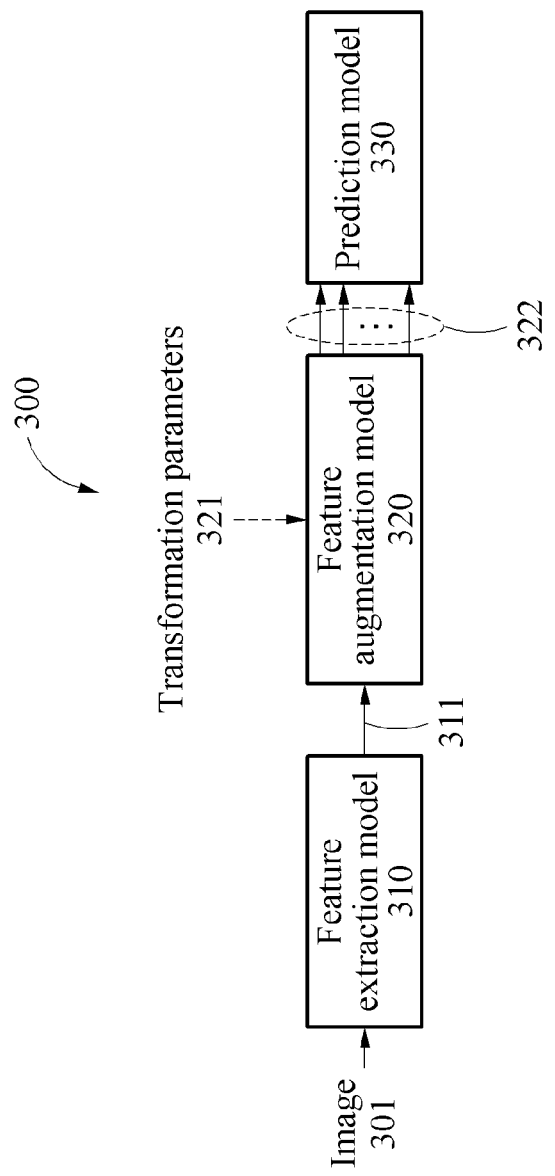
FIG. 3 illustrates an example of a feature augmentation method.

FIG. 2 illustrates a conventional data augmentation method according to a related art, and FIG. 3 illustrates an example of a feature augmentation method. Referring to FIG. 2, a data augmentation model 210 may generate augmented images 212 based on an image 201 and transformation parameters 211. The data augmentation model 210 may be a neural network model. The transformation parameters 211 may indicate various transformations. Transformations may include, for example, scaling, cropping, flipping, padding, rotation, translation, color transformation, brightness transformation, contrast transformation, and noise addition. The transformation parameters 211 may specify a transformation to be applied among the transformations and a number of transformations to be applied.

The same number of augmented images 212 as a number of transformation parameters 211 may be generated. For example, when the number of transformation parameters 211 is "N", the number of augmented images 212 may also be "N". A feature extraction model 220 may extract a feature from each of the augmented images 212 and may generate features 221. When the number of augmented images 212 is "N", the feature extraction model 220 may be executed "N" times, and accordingly "N" features 221 may be generated. A prediction model 230 may perform prediction based on the features 221. When the above operation corresponds to a training operation of an image processing model 200, the image processing model 200 may be updated by a prediction result. When the above operation corresponds to an inference operation, the prediction result may be output as an inference result. As described above, due to a computation load caused by repetitive execution of the feature extraction model 220, the data augmentation method of FIG. 2 may be mainly used in a training operation.

Referring to FIG. 3, an image processing model 300 may include a feature augmentation model 320, instead of the data augmentation model 210 of FIG. 2. A feature extraction model 310 may extract a feature 311 from an image 301. The feature augmentation model 320 may generate augmented features 322 based on the feature 311 and transformation parameters 321. The feature augmentation model 320 may be a neural network model. The transformation parameters 321 may correspond to the transformation parameters 211 of FIG. 2. The same number of augmented features 322 as a number of transformation parameters 321 may be generated. For example, when the number of transformation parameters 321 is "N", the number of augmented features 322 may also be "N". Thus, although the feature extraction model 310 is executed once, the "N" augmented features 322 may be generated.

A prediction model 330 may perform prediction based on the augmented features 322. In an example, when the above operation corresponds to a training operation of the image processing model 300, the image processing model 300 may be updated by a prediction result. In another example, when the above operation corresponds to an inference operation, the prediction result may be output as an inference result. As described above, since a computation load is significantly reduced by a decrease in a number of times the feature extraction model 310 is executed, the feature augmentation method may be used in both the training operation and the inference operation.

Figure 4:
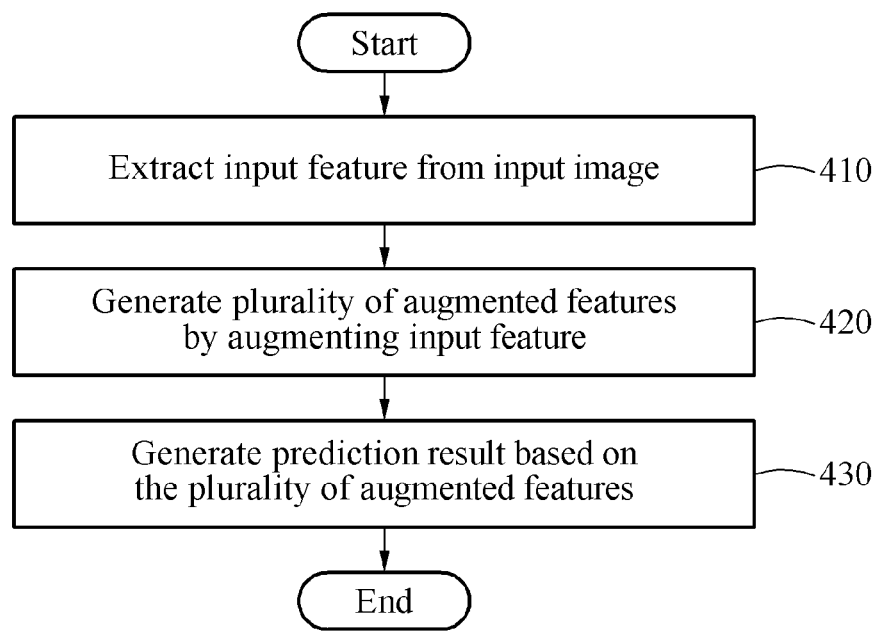
FIG. 4 illustrates an example of an image processing method through feature augmentation.

FIG. 4 illustrates an example of an image processing method through feature augmentation. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, an image processing apparatus may extract an input feature from an input image. For example, the image processing apparatus may execute a CNN using the input image, and may obtain an input feature corresponding to an execution result.

In operation 420, the image processing apparatus may generate a plurality of augmented features by augmenting the input feature. For example, the image processing apparatus may execute a neural network model based on the input feature and a first transformation code and may generate a first augmented feature corresponding to the first transformation code. Also, the image processing apparatus may execute the neural network model based on the input feature and second transformation code and may generate a second augmented feature corresponding to the second transformation code. The neural network model may be a feature augmentation model, and the first transformation code and the second transformation code may correspond to transformations based on different transformation parameters.

In operation 430, the image processing apparatus may generate a prediction result based on the plurality of augmented features. The image processing apparatus may generate a plurality of partial prediction results based on the plurality of augmented features, may fuse the partial prediction results, and may generate the prediction result. For example, the image processing apparatus may generate the prediction result based on a fusion of a first partial prediction result according to the first augmented feature and a second partial prediction result according to the second augmented feature.

Figure 5:
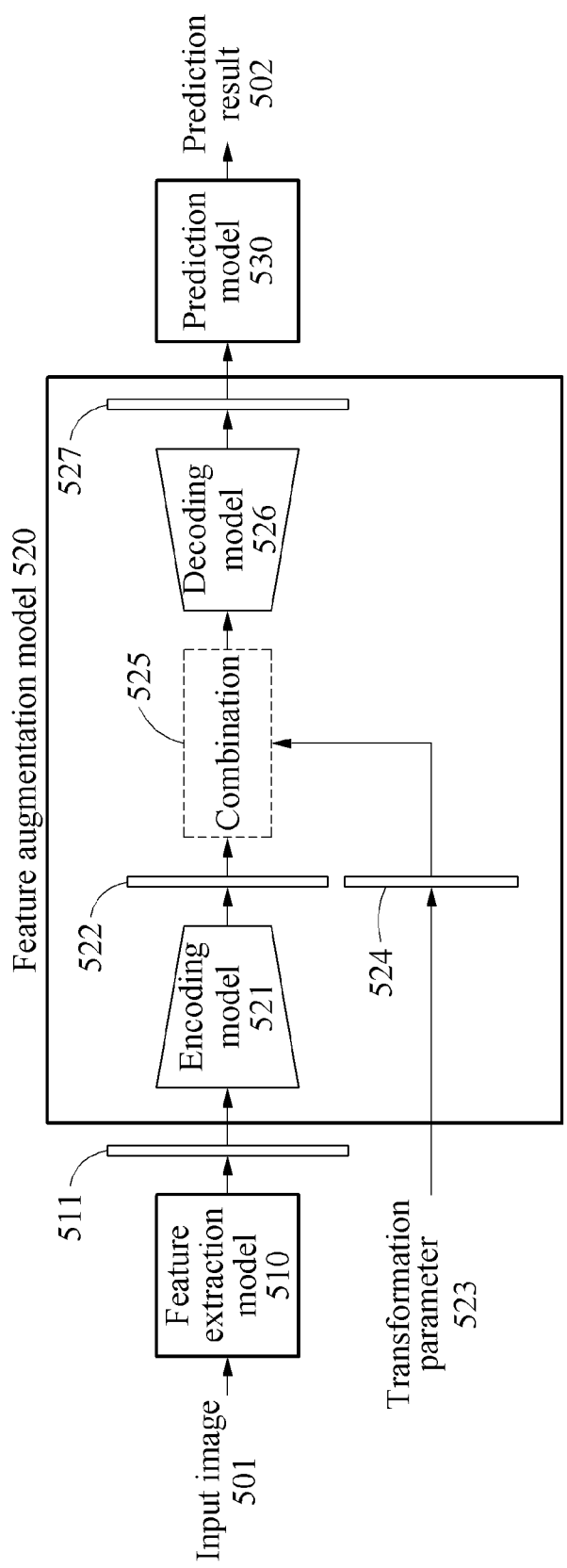
FIG. 5 illustrates an example of a configuration and an operation of a feature augmentation model.

FIG. 5 illustrates a configuration and an operation of a feature augmentation model 520. Referring to FIG. 5, a feature extraction model 510 may extract an input feature 511 from an input image 501. The feature augmentation model 520 may generate an augmented feature 527 based on the input feature 511 and a transformation parameter 523. A prediction model 530 may generate a prediction result 502 based on the augmented feature 527.

The feature augmentation model 520 may include an encoding model 521 and a decoding model 526. The encoding model 521 and the decoding model 526 may be neural network models. For example, each of the encoding model 521 and the decoding model 526 may correspond to an FCN. The encoding model 521 may encode the input feature 511 to the latent feature 522. An image processing apparatus may transform the latent feature 522 based on the transformation parameter 523. For example, the image processing apparatus may generate a transformation code 524 corresponding to the transformation parameter 523, may combine the latent feature 522 with the transformation code 524 through a combination operation (for example, a concatenation operation) of a block 525, and may determine the combined feature. The image processing apparatus may decode the combined feature to the augmented feature 527 using the decoding model 526.

The transformation code 524 may be generated by converting the transformation parameter 523 into a form that may be processed in a neural network model and/or a form that may be combined with the latent feature 522. For example, the transformation code 524 may be in a form of a vector that may be adopted for convenience of training and inference of the neural network model. In an example, when the transformation parameter 523 is in a form of data that may be combined with the latent feature 522, the transformation code 524 may not be generated. In this example, the transformation parameter 523 may be used as a transformation code.

In an example, the transformation parameter 523 may indicate a type of transformation and/or a degree of transformation. The transformation code 524 may include a first field indicating the type of transformation and a second field indicating the degree of transformation. For example, the second field may have a form of a one-hot vector, and the degree of transformation may be specified based on which bit in a field has a value of "1". For example, the type of transformation indicated by the first field may be specified as translation, and a direction and a degree of translation indicated by the second field may be specified. For example, when the second field is a c-bit, "c/2" upper bits may indicate offset in an x-axis direction, and "c/2" lower bits may indicate offset in a y-axis direction. Also, the transformation parameter 523 may indicate various transformations. The type of transformation may include, for example, scaling, cropping, flipping, padding, rotation, translation, color transformation, brightness transformation, contrast transformation, and noise addition. A value of the transformation parameter 523 may be randomly determined, may be determined based on a preset pattern, or may be determined depending on a characteristic of the input image 501.

When the transformation parameter 523 includes a first transformation parameter and a second transformation parameter, the first transformation parameter and the second transformation parameter may indicate different transformations, and accordingly a first augmented feature and a second augmented feature corresponding to different features may be generated. In other words, when the input feature 511 is extracted from the input image 501, various augmented features 527 may be generated by changing the transformation parameter 523. In this example, the feature extraction model 510 may not need to be additionally executed, and the encoding model 521 may also not need to be further executed. To generate various augmented features 527, the latent feature 522 may need to be combined and decoded while changing a value of the transformation parameter 523. Thus, diversity of the augmented features 527 may be secured with a relatively small amount of computation.

Figure 6A:
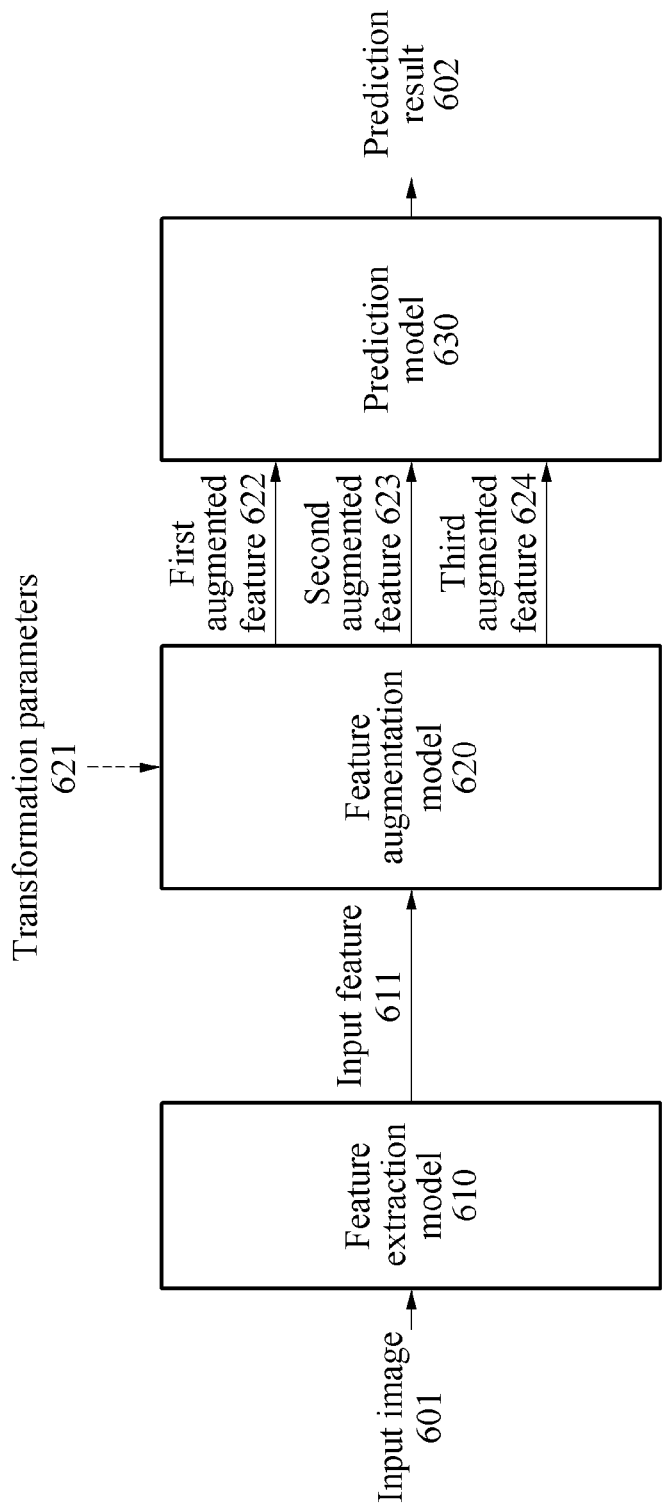
FIGS. 6A and 6B illustrate examples of operations of deriving a prediction result based on augmented features.
Figure 6B:
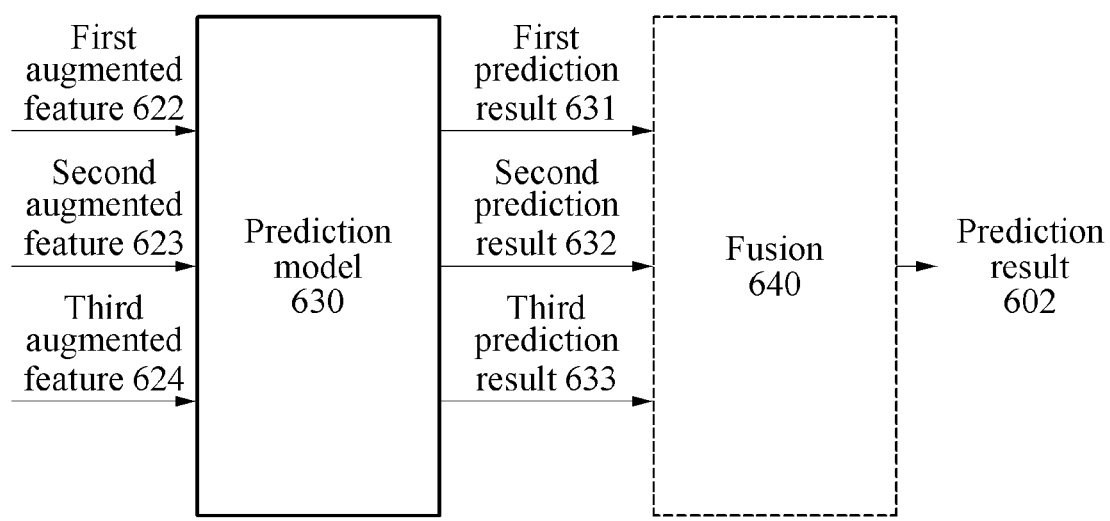

FIGS. 6A and 6B illustrate examples of operations of deriving a prediction result based on augmented features. Referring to FIG. 6A, a feature extraction model 610 may extract an input feature 611 from an input image 601, and a feature augmentation model 620 may generate a first augmented feature 622, a second augmented feature 623, and a third augmented feature 624 based on the input feature 611 and transformation parameters 621. For example, the transformation parameters 621 may include a first transformation parameter, a second transformation parameter, and a third transformation parameter. The first augmented feature 622 may be generated based on the input feature 611 and the first transformation parameter, the second augmented feature 623 may be generated based on the input feature 611 and the second transformation parameter, and the third augmented feature 624 may be generated based on the input feature 611 and the third transformation parameter. For example, when the input feature 611 input to the feature augmentation model 620 is encoded to a latent feature, the latent feature may be combined with a transformation code of each transformation parameter and the combined feature may be decoded, to generate the first augmented feature 622 through the third augmented feature 624. Although three augmented features, for example, the first augmented feature 622 through the third augmented feature 624, are illustrated in FIGS. 6A and 6B for convenience of description, a number of augmented features may be greater than "3".

A prediction model 630 may generate a prediction result 602 based on the first augmented feature 622 through the third augmented feature 624. Referring to FIG. 6B, the prediction model 630 may generate a first partial prediction result 631, a second partial prediction result 632, and a third partial prediction result 633, by performing prediction for each of the first augmented feature 622 through the third augmented feature 624. The prediction model 630 may be repeatedly executed by each of the first augmented feature 622 through the third augmented feature 624. For example, the prediction model 630 may be executed based on the first augmented feature 622 to generate the first partial prediction result 631, may be executed based on the second augmented feature 623 to generate the second partial prediction result 632, and may be executed based on the third augmented feature 624 to generate the third partial prediction result 633. The first partial prediction result 631 through the third partial prediction result 633 may be fused in a fusion block 640, and accordingly the prediction result 602 may be generated. A fusion may include, for example, an averaging operation of the first partial prediction result 631 through the third partial prediction result 633, and the fusion block 640 may be implemented as a neural network model, for example, an FCN.

Figure 7:
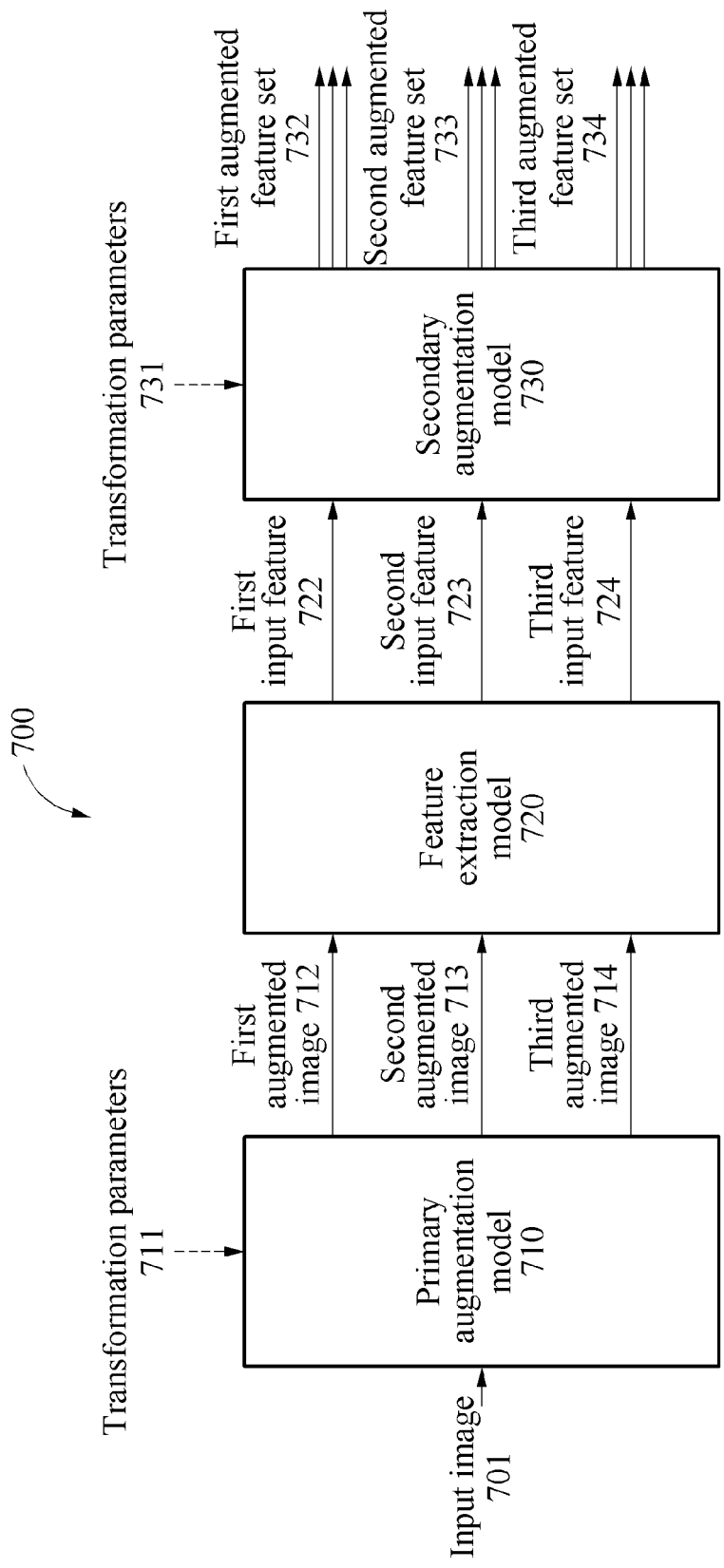
FIG. 7 illustrates an example of a mixed scheme of data augmentation and feature augmentation.

FIG. 7 illustrates an example of a mixed scheme of data augmentation and feature augmentation. Referring to FIG. 7, an image processing model 700 may include a primary augmentation model 710 and a secondary augmentation model 730. The primary augmentation model 710 may perform data augmentation, and the secondary augmentation model 730 may perform feature augmentation. To reduce a computation load, diversity of the data augmentation may be limited, and instead a lack of the diversity may be supplemented by the feature augmentation. For example, a number of augmented images based on the data augmentation may be "J" and a number of augmented features based on the feature augmentation may be "K". In this example, "K" may have a significantly higher value than "J".

The primary augmentation model 710 may augment an input image 701 based on transformation parameters 711, and may generate a first augmented image 712, a second augmented image 713, and a third augmented image 714. For example, a number of augmented images, for example, the first augmented image 712 through the third augmented image 714, may correspond to a number of transformation parameters 711. Although three augmented images are shown in FIG. 7 for convenience of description, the number of augmented images may be varied, and may be "2", "4", or greater. For example, when the input image 701 is a user image, the first augmented image 712 may be an image representing a user's face obtained by cropping the input image 701, the second augmented image 713 may be an image representing a portion (for example, a left eye) of the user's face by cropping the input image 701, and the third augmented image 714 may be an image representing another portion (for example, a right eye) of the user's face by cropping the input image 701. The primary augmentation model 710 may be a neural network model, and may generate a relatively small number of augmented images by performing data augmentation in a known manner.

A feature extraction model 720 may extract a feature from each of the first augmented image 712 through the third augmented image 714, and may generate a first input feature 722, a second input feature 723, and a third input feature 724. The feature extraction model 720 may be repeatedly executed by the first input feature 722 through the third input feature 724. For example, the feature extraction model 720 may be executed based on the first augmented image 712 to generate the first input feature 722, may be executed based on the second augmented image 713 to generate the second input feature 723, and may be executed based on the third augmented image 714 to generate the third input feature 724. To minimize a number of times the feature extraction model 720 is executed, a number of augmented images may be limited to a small number.

The secondary augmentation model 730 may augment the first input feature 722 through the third input feature 724 based on transformation parameters 731 and may generate a first augmented feature set 732, a second augmented feature set 733 and a third augmented feature set 734. For example, the secondary augmentation model 730 may be executed based on the transformation parameters 731 and the first input feature 722 to generate the first augmented feature set 732, may be executed based on the transformation parameters 731 and the second input feature 723 to generate the second augmented feature set 733, and may be executed based on the transformation parameters 731 and the third input feature 724 to generate the third augmented feature set 734. The first augmented feature set 732 through the third augmented feature set 734 may each include a predetermined number of augmented features, and the number of augmented features may correspond to a number of transformation parameters 731. For example, "K" transformation parameters 731 may be provided, and each of the first augmented feature set 732 through the third augmented feature set 734 may include "K" augmented features.

The first augmented feature set 732 through the third augmented feature set 734 may be input to a prediction model, although not shown in FIG. 7, and accordingly a prediction result may be generated. The above description provided with reference to FIGS. 6A and 6B may be applied to generation of a prediction result.

Figure 8:
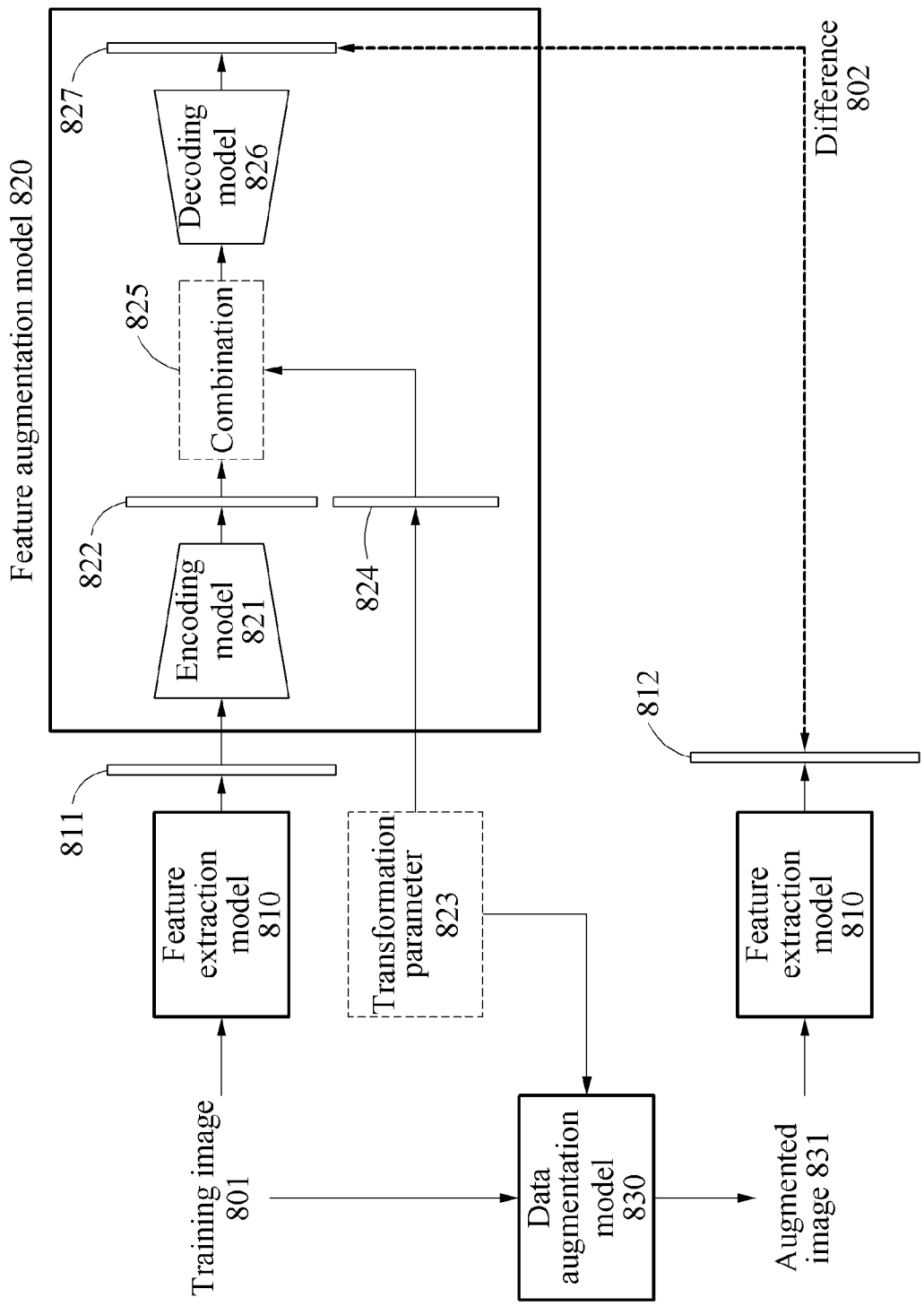
FIG. 8 illustrates an example of an operation of training a feature augmentation model.

FIG. 8 illustrates an example of an operation of training a feature augmentation model. Referring to FIG. 8, a feature extraction model 810 may extract a training feature 811 from a training image 801, and a feature augmentation model 820 may generate an augmented feature 827 by transforming the training feature 811 based on a transformation parameter 823. For example, an encoding model 821 may generate a latent feature 822 by encoding the training feature 811, and the latent feature 822 may be combined with a transformation code 824 in a combination block 825. A decoding model 826 may decode the combined feature to generate the augmented feature 827. A data augmentation model 830 may generate an augmented image 831 by transforming the training image 801 based on the transformation parameter 823, and the feature extraction model 810 may extract an augmented feature 812 from the augmented image 831.

As described above, a feature augmentation operation of obtaining the augmented feature 827 from the training image 801 using the transformation parameter 823 may correspond to a data augmentation operation of obtaining the augmented feature 812 from the training image 801 using the transformation parameter 823. Accordingly, the feature augmentation model 820 may be trained using the data augmentation model 830 that exists. For example, when the augmented features 827 and 812 are derived from the training image 801, parameters of the feature augmentation model 820, for example, the encoding model 821 and/or the decoding model 826, may be updated to reduce a difference 802 between the augmented features 827 and 812. In this example, the feature extraction model 810 may be assumed to be pre-trained, and parameters of the feature extraction model 810 may be fixed in a process of training the feature augmentation model 820.

Figure 9:
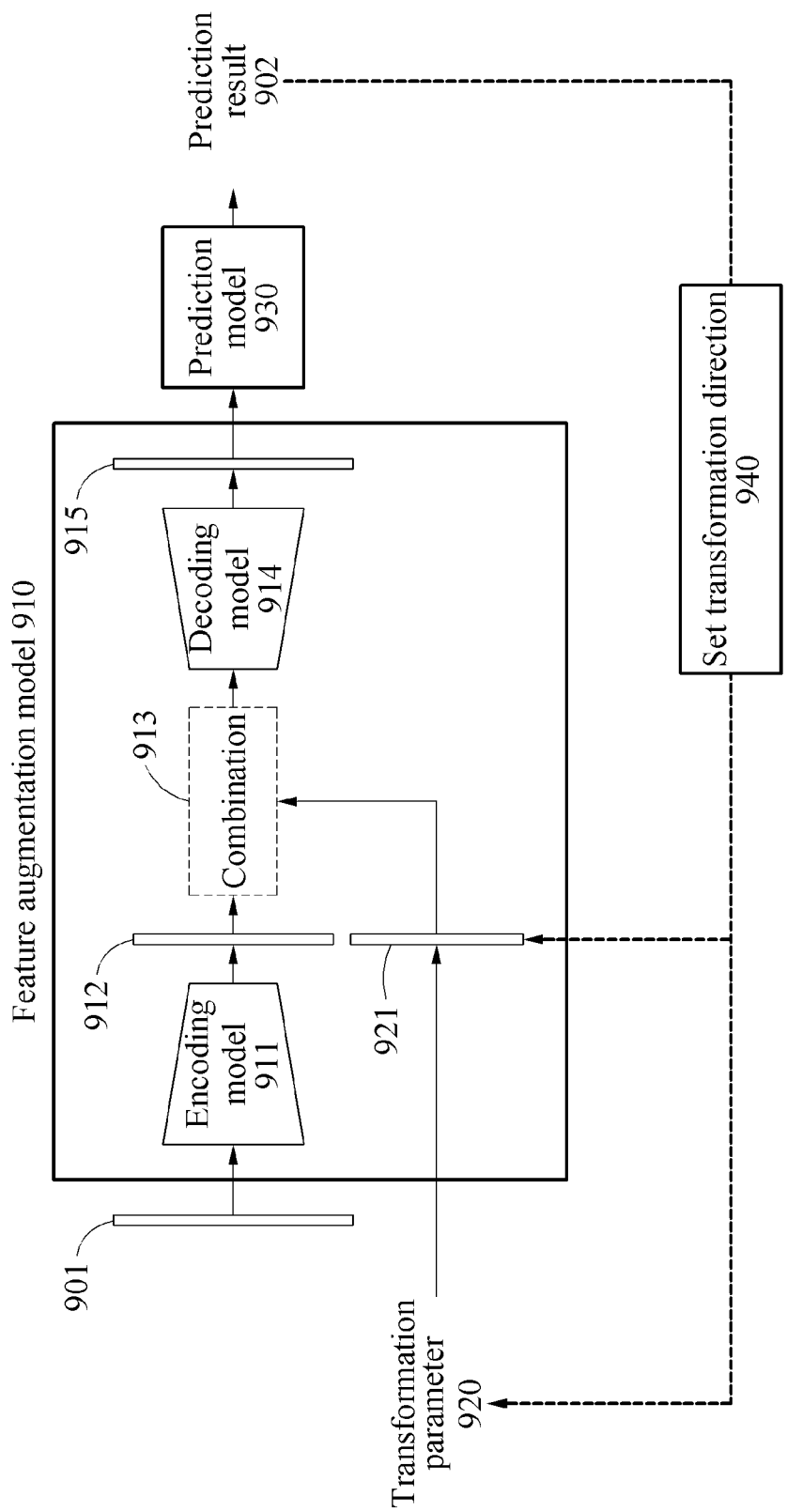
FIG. 9 illustrates an example of a training operation based on a gradient of a prediction result.

FIG. 9 illustrates an example of a training operation based on a gradient of a prediction result. Referring to FIG. 9, in a block 940, a transformation direction of a transformation parameter 920 and/or a transformation code 921 may be set based on a gradient of a prediction result 902. The above scheme may exhibit a higher efficiency than that of a scheme of randomly transforming the transformation parameter 920 and/or the transformation code 921.

For example, a feature augmentation model 910 may augment a feature 901 based on the transformation parameter 920 and may generate an augmented feature 915. An encoding model 911 may encode the feature 901 to a latent feature 912, and the latent feature 912 may be combined with the transformation code 921 through a combination operation (for example, a concatenation operation) of a block 913. A decoding model 914 may decode the combined feature to the augmented feature 915.

For example, the transformation parameter 920 may include a first transformation parameter through a third transformation parameter that may be converted into a first transformation code through a third transformation code, respectively. In this example, the first transformation code may have an arbitrary value, and a value of a second transformation code and a value of the third transformation code may be determined based on gradients of partial prediction results according to previous transformation codes, for example, the first transformation code and the second transformation code, respectively. The feature augmentation model 910 may generate a first augmented feature based on the feature 901 and the first transformation code. A prediction model 930 may generate a first partial prediction result based on the first augmented feature. The second transformation code may have a null value at an initial operation, and the null value may be adjusted based on a gradient of the first partial prediction result.

For example, the transformation code 921 may include a first field indicating a type of transformation and a second field indicating a degree of transformation. The first field may be assumed to be fixed as translation and the second field may be assumed to be adjusted. A predetermined bit in the second field may indicate a translation value in an x-axis direction, and the other bits may indicate translation values in a y-axis direction. For example, when translation values of axes of the first partial prediction result are pred_x and pred_y, gradients may be obtained for each of pred_x and pred_y. In an example, gradient vectors g_x1, g_x2, g_y1, and g_y2 may be defined in descending and ascending directions of the gradients with respect to a translation value of each axis. In this example, the gradient vector g_x1 in an ascending direction of pred_x may be calculated as shown in Equation 1 below.

$$g\_x1 = sgn(top\_1(\nabla_c pred\_x))$$ [Equation 1]

In Equation 1, $\nabla_c$ denotes a gradient, and top_1( ) denotes a function that sets values other than a maximum value of a vector to "0" while maintaining the maximum value. Also, sgn( ) denotes a function with a symbol of each value of a vector, and an output value may be {−1, 0, 1}. Similarly, in the same manner as in Equation 1, g_x2, g_y1, and g_y2 may be calculated, and accordingly the second transformation code may be determined based on a gradient vector.

The second transformation code may be combined with the latent feature 912, and the decoding model 914 may decode the combined feature to a second augmented feature. The prediction model 930 may generate a second partial prediction result based on the second augmented feature. The third transformation code may have a null value at an initial operation, and the null value may be adjusted based on a gradient of the second partial prediction result. When a third partial prediction result is generated based on the third transformation code, the prediction result 902 may be derived through a fusion of the first partial prediction result through the third partial prediction result. Thus, the transformation direction may be efficiently determined based on a guideline according to the gradient.

Figure 10:
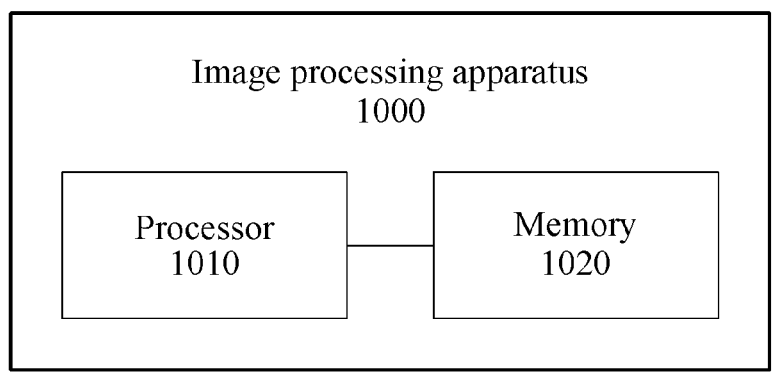
FIG. 10 illustrates an example of a configuration of an image processing apparatus.

FIG. 10 illustrates an example of a configuration of an image processing apparatus 1000. Referring to FIG. 10, the image processing apparatus 1000 may include a processor 1010 and a memory 1020. The memory 1020 may be connected to the processor 1010, and may store instructions executable by the processor 1010, data to be computed by the processor 1010, or data processed by the processor 1010. The memory 1020 may include, for example, a non-transitory computer-readable storage medium, for example, a high-speed random access memory (RAM) and/or a non-volatile computer-readable storage medium (for example, at least one disk storage device, a flash memory device, or other non-volatile solid state memory devices). Further details regarding the memory 1020 is provided below.

Figure 11:
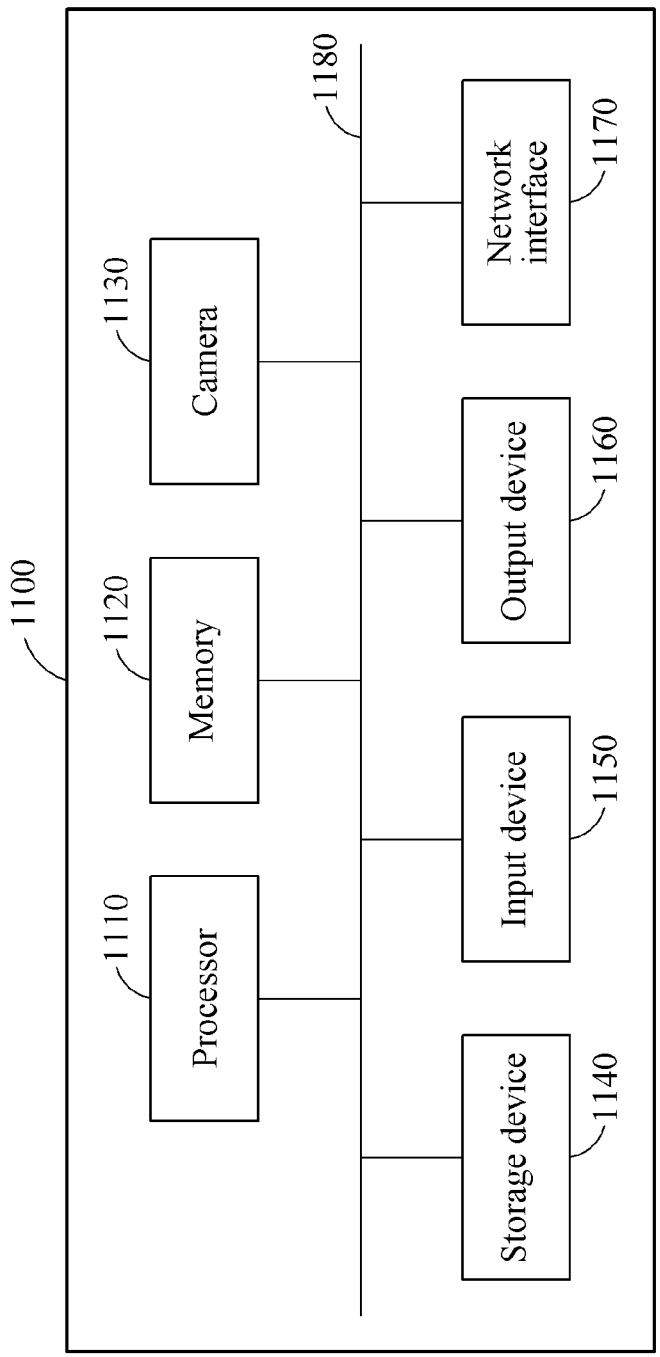
FIG. 11 illustrates an example of a configuration of an electronic apparatus.

The processor 1010 may execute instructions to perform the operations described above with reference to FIGS. 1 through 9 above and FIG. 11 below. For example, the processor 1010 may extract an input feature from an input image, may generate a plurality of augmented features by augmenting the input feature, and may generate a prediction result based on the plurality of augmented features. In addition, the description of FIGS. 1 through 9 and 11 is also applicable to the image processing apparatus 1000. Further details regarding the processor 1010 is provided below.

FIG. 11 illustrates an example of a configuration of an electronic apparatus 1100. Referring to FIG. 11, the electronic apparatus 1100 may include a processor 1110, a memory 1120, a camera 1130, a storage device 1140, an input device 1150, an output device 1160, and a network interface 1170. The processor 1110, the memory 1120, the camera 1130, the storage device 1140, the input device 1150, the output device 1160, and the network interface 1170 may communicate with each other via a communication bus 1180. For example, the electronic apparatus 1100 may be implemented as at least a portion of, for example, a mobile device such as a mobile phone, a smartphone, a personal digital assistant (PDA), a netbook, a tablet computer or a laptop computer, a wearable device such as a smartwatch, a smart band or smart glasses, a computing device such as a desktop or a server, home appliances such as a television (TV), a smart TV or a refrigerator, a security device such as a door lock, or a vehicle such as an autonomous vehicle or a smart vehicle. The electronic apparatus 1100 may structurally and/or functionally include the image processing apparatus 100 of FIG. 1 and the image processing apparatus 1000 of FIG. 10.

The processor 1110 may execute instructions and functions in the electronic apparatus 1100. For example, the processor 1110 may process instructions stored in the memory 1120 or the storage device 1140. The processor 1110 may perform the operations described above with reference to FIGS. 1 through 10. The memory 1120 may store data for image processing. The memory 1120 may include a non-transitory computer-readable storage medium or a non-transitory computer-readable storage device. The memory 1120 may store instructions that are to be executed by the processor 1110, and may also store information associated with software and/or applications when the software and/or applications are being executed by the electronic apparatus 1100.

The camera 1130 may capture a photo and/or a video. For example, the camera 1130 may capture a face image including a face of a user. The camera 1130 may be, for example, a three-dimensional (3D) camera including depth information about objects. The storage device 1140 may include a non-transitory computer-readable storage medium or a non-transitory computer-readable storage device. The storage device 1140 may store a greater amount of information than that of the memory 1120 for a relatively long period of time. For example, the storage device 1140 may include magnetic hard disks, optical disks, flash memories, floppy disks, or other forms of non-volatile memories known in the art.

The input device 1150 may receive an input from a user through a traditional input scheme using a keyboard and a mouse, and through a new input scheme such as a touch input, a voice input, a gesture input, and an image input. The input device 1050 may include, for example, a keyboard, a mouse, a touch screen, a microphone, or other devices configured to detect an input from a user and transmit the detected input to the electronic apparatus 1100. The output device 1160 may provide a user with an output of the electronic apparatus 1100 through a visual channel, an auditory channel, or a tactile channel. The output device 1160 may include, for example, a display, a touchscreen, a speaker, a vibration generator, or other devices configured to provide a user with the output. The network interface 1170 may communicate with an external device via a wired or wireless network.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In an example, the instructions or software includes at least one of an applet, a dynamic link library (DLL), middleware, firmware, a device driver, an application program storing the image processing method. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An image processing method comprising:
    extracting an input feature from an input image;
    generating augmented features by augmenting the input feature; and
    generating a prediction result based on the augmented features,
    wherein the generating of the augmented features is performed using an inference operation of a trained machine learning model.

2. The image processing method of claim 1, wherein the generating of the augmented features comprises generating a first augmented feature based on executing a neural network model, of the machine learning model, based on the input feature and a first transformation code.

3. The image processing method of claim 2, wherein the neural network model comprises an encoding model and a decoding model, and
    the generating of the first augmented feature comprises:
        encoding the input feature to a latent feature using the encoding model;
        combining the latent feature and the first transformation code to determine a combined feature; and
        decoding the combined feature to the first augmented feature using the decoding model.

4. The image processing method of claim 2, wherein the generating of the augmented features comprises:
    generating a second augmented feature based on another executing of the neural network model based on the input feature and a second transformation code.

5. The image processing method of claim 4, wherein the first transformation code and the second transformation code correspond to different transformations.

6. The image processing method of claim 4, wherein the generating of the prediction result comprises generating the prediction result based on a fusion of a first partial prediction result according to the first augmented feature and a second partial prediction result according to the second augmented feature.

7. The image processing method of claim 1, wherein the generating of the prediction result comprises:
    generating a plurality of partial prediction results based on the plurality of augmented features; and
    generating the prediction result by fusing the plurality of partial prediction results.

8. The image processing method of claim 1, wherein the generating of the augmented features comprises augmenting the input feature based on transformation parameters corresponding to different transformations.

9. The image processing method of claim 8, wherein the transformations comprise any one or any combination of two or more of scaling, cropping, flipping, padding, rotation, translation, color transformation, brightness transformation, contrast transformation, and noise addition.

10. A non-transitory computer-readable storage medium storing instructions that, when executed by a processor, cause the processor to perform the image processing method of claim 1.

11. An apparatus comprising:
    a processor configured to:
        extract an input feature from an input image;
        generate augmented features by augmenting the input feature; and
        generate a prediction result based on the augmented features, wherein the generation of the augmented features is performed using an inference operation of a trained machine learning model.

12. The apparatus of claim 11, wherein the processor is further configured to generate a first augmented feature based on an execution of a neural network model, of the machine learning model, based on the input feature and a first transformation code.

13. The apparatus of claim 12, wherein the processor is further configured to generate a second augmented feature based on another execution of the neural network model based on the input feature and a second transformation code.

14. The apparatus of claim 13, wherein the processor is further configured to generate the prediction result based on a fusion of a first partial prediction result according to the first augmented feature and a second partial prediction result according to the second augmented feature.

15. The apparatus of claim 11, wherein the processor is further configured to perform multiple augments of the input feature based on transformation parameters corresponding to different transformations, and
wherein, for the generating of the prediction result, the processor is configured to generate the prediction result dependent on results of the multiple augments.

16. The apparatus of claim 15, wherein the transformation parameters correspond to at least one of scaling, cropping, flipping, padding, rotation, translation, color transformation, brightness transformation, contrast transformation, or noise addition, or correspond to the scaling, the cropping, the flipping, the padding, the rotation, the translation, the color transformation, the brightness transformation, the contrast transformation, and the noise addition.

17. The apparatus of claim 11, wherein, for the generating of the augmented features, the processor is configured to:
encode the input feature using an encoding model, as a first machine learning model; and
decode a generated feature, dependent on the encoded input feature and a first transformation code, into a first augmented feature using a decoding model, as a second machine learning model.

18. The apparatus of claim 17,
wherein the processor is further configured to generate a second augmented feature using the decoding model based on the encoded feature and a second transformation code corresponding to a second transformation information that is different from a first transformation information which corresponds to the first transformation code,
wherein the first transformation information is first information with respect to at least one of scaling, cropping, flipping, padding, rotation, translation, color transformation, brightness transformation, contrast transformation, or noise addition, and the second transformation information is second information with respect to at least one of a corresponding scaling, a corresponding cropping, a corresponding flipping, a corresponding padding, a corresponding rotation, a corresponding translation, a corresponding color transformation, a corresponding brightness transformation, a corresponding contrast transformation, or a corresponding noise addition, and
wherein, for the generating of the prediction result, the processor is configured to generate the prediction result dependent on the first augmented feature and the second augmented feature.

19. An electronic apparatus comprising:
a camera configured to generate the input image; and
the apparatus of claim 17.

20. An image processing apparatus comprising:
a processor configured to:
extract an input feature from an input image;
generate augmented features by augmenting the input feature; and
generate a prediction result based on the augmented features,
wherein the processor is further configured to generate a first augmented feature based on an execution of a neural network model based on the input feature and a first transformation code, and
wherein the neural network model comprises an encoding model and a decoding model, and the processor is further configured to:
encode the input feature to a latent feature using the encoding model;
combine the latent feature and the first transformation code to determine a combined feature; and
decode the combined feature to the first augmented feature using the decoding model.

21. An electronic apparatus comprising:
a camera configured to generate an input image; and
a processor configured to:
extract an input feature from the input image;
generate augmented features by augmenting the input feature; and
generate a prediction result based on the augmented features, wherein the generation of the augmented features is performed using an inference operation of a trained machine learning model.

22. The electronic apparatus of claim 21, wherein the processor is further configured to generate a first augmented feature based on executing a neural network model based on the input feature and a first transformation code.

23. The electronic apparatus of claim 22, wherein the processor is further configured to generate a second augmented feature based on another executing of the neural network model based on the input feature and a second transformation code.

24. The electronic apparatus of claim 23, wherein the processor is further configured to generate the prediction result based on a fusion of a first partial prediction result according to the first augmented feature and a second partial prediction result according to the second augmented feature.

* * * * *